(12) United States Patent
Yamazaki et al.

(10) Patent No.: US 7,763,315 B2
(45) Date of Patent: Jul. 27, 2010

(54) PROCESS FOR PREPARING A METAL COATING MATERIAL COMPRISING CONDENSATION POLYMERIZED RESIN NANOPARTICLES

(75) Inventors: Masao Yamazaki, Kyoto (JP); Yoshiyuki Asai, Kyoto (JP); Yoichi Kitamura, Takarazuka (JP); Tsuyoshi Hasegawa, Osaka (JP)

(73) Assignee: Sakuranomiya Chemical Co., Ltd, Osaka (JP)

( * ) Notice: Subject to any disclaimer, the term of this patent is extended or adjusted under 35 U.S.C. 154(b) by 323 days.

(21) Appl. No.: 10/569,597

(22) PCT Filed: Aug. 20, 2004

(86) PCT No.: PCT/JP2004/011993

§ 371 (c)(1),
(2), (4) Date: Feb. 24, 2006

(87) PCT Pub. No.: WO2005/019363

PCT Pub. Date: Mar. 3, 2005

(65) Prior Publication Data
US 2006/0292382 A1    Dec. 28, 2006

(30) Foreign Application Priority Data

Aug. 25, 2003  (JP) ............................. 2003-299916

(51) Int. Cl.
*B05D 3/02*    (2006.01)
*B32B 15/08*   (2006.01)

(52) U.S. Cl. ...................... 427/195; 427/180; 427/189; 428/402; 428/457; 428/458

(58) Field of Classification Search ........................ None
See application file for complete search history.

(56) References Cited

U.S. PATENT DOCUMENTS

| 3,617,351 | A | * | 11/1971 | Long et al. .................... 427/194 |
| 3,844,991 | A | * | 10/1974 | Ferraro et al. ................ 523/307 |
| 3,943,115 | A | * | 3/1976 | Kawaguchi et al. .......... 528/491 |
| 4,221,862 | A | * | 9/1980 | Naito et al. .................. 430/536 |
| 5,242,994 | A | * | 9/1993 | Nield et al. ................... 525/438 |
| 5,276,106 | A |   | 1/1994 | Portelli et al. |
| 5,883,170 | A |   | 3/1999 | Tanaka et al. |
| 6,312,858 | B1 | * | 11/2001 | Yacobucci et al. ............. 430/17 |
| 7,009,003 | B2 | * | 3/2006 | Cruz ........................... 525/239 |
| 2005/0084513 | A1 | * | 4/2005 | Tang ........................... 424/423 |

FOREIGN PATENT DOCUMENTS

| EP | 0465001 | 1/1992 |
| JP | 7-216034 | 8/1995 |
| JP | 8-311372 | 11/1996 |
| JP | 11-19581 | 1/1999 |
| JP | 11-148047 | 6/1999 |
| JP | 2000-53892 | 2/2000 |
| JP | 2000-198949 | 7/2000 |
| JP | 2004107413 A * | 4/2004 |

* cited by examiner

*Primary Examiner*—Monique R Jackson
(74) *Attorney, Agent, or Firm*—Antonelli, Terry, Stout & Kraus, LLP.

(57) ABSTRACT

Disclosed are a coating material for metal wherein a thin coating film without pinholes having excellent corrosion resistance, retort resistance, impact resistance, processing resistance, abrasion resistance, adhesiveness to a metal, flavor preservability for contents etc can be formed when applying on a metal plate or a metallic container, and a metallic container on which the coating material is applied. The coating material for metal includes thermoplastic resin particles having an average primary particle size of 10 to 800 nm obtained by cooling a solution of the thermoplastic resin. A process for preparing the coating material for metal comprises steps of (a) obtaining a solution wherein a thermoplastic resin is dissolved into an organic solvent, (b) obtaining a dispersion of particles of the thermoplastic resin having an average primary particle size of 10 to 800 nm by cooling the solution, (c) separating particles from the dispersion and (d) dispersing the separated particles in a solvent.

4 Claims, 9 Drawing Sheets

US 7,763,315 B2

PROCESS FOR PREPARING A METAL COATING MATERIAL COMPRISING CONDENSATION POLYMERIZED RESIN NANOPARTICLES

RELATED APPLICATION

This is a U.S. national phase application under 35 U.S.C. §371 of International Application No. PCT/JP2004/011993 filed Aug. 20, 2004, claiming priority of Japanese Application No. 2003-299916 filed Aug. 25, 2003.

TECHNICAL FIELD

The present invention relates to a coating material for metal and a preparation process thereof, and a metallic container on which the coating material is applied and a preparation process thereof. Specifically, the present invention relates to a coating material for metal on which a thin coating film without pinholes, having excellent strength, solvent resistance, impact resistance, processability etc can be easily formed in a short time, when applying on a metal plate, compared with a laminate material, and a preparation process thereof. The present invention also relates to a metallic container on which the coating material is applied and a preparation process thereof.

BACKGROUND ART

Conventionally, coating and printing are generally applied on a surface of a metallic container such as food can which preserves foods etc and beverage can for imparting corrosion resistance and decoration.

For instance, JP-A-6-306325 discloses a resin composition for an aqueous coating material comprising an acrylic emulsion, an acrylic modified epoxy resin and an amino resin. However, the acrylic emulsion contains a monomer contributing to crosslinking, and water with high surface tension is used as a solvent. As the result of causing material contraction at heat treatment, pinholes occur in the coating film, thus, the acrylic emulsion is not fully satisfactory in terms of corrosion resistance and decoration.

Also, JP-A-2000-53892 describes a coating material containing polyethylene terephthalate (PET) resin powder. The PET resin powder is prepared by separating out particles by water cooling from a solution of mixed pellets containing a regenerated PET resin. However, a cooling speed of the solution of the mixed pellets is slow since water cooling is used as a means of cooling in this process, and an average particle size of the obtained particles is about 40 μm at minimum, which is significantly large. Therefore, a coating film comprising this coating material becomes thick, depending on the average particle size of the particles contained thereto, and the PET resin is not fully satisfactory in viewpoints of appearance, processability and cost.

JP-A-11-156998 describes a metal plate on which a film without pinholes is laminated. However, there is a limitation to thin down the laminate film, and it is difficult to obtain a thinner film with a thickness of about a few μm. Consequently, the metal plate is not fully satisfactory in viewpoints of appearance, processability and cost.

JP-A-2002-120278 describes a process for preparing a resin coated metal plate in which a film is prepared by heat-melting a thermoplastic resin and the obtained film is pressurized to adhere to a metal plate by a pressure roll and then cooled rapidly to at most Tg. However, the equipment is too grand and there is a limitation for making a thin film as well as JP-A-11-156998. Consequently, the resin coated metal plate is not fully satisfactory in viewpoints of appearance, processability and cost.

DISCLOSURE OF INVENTION

Herein, the present invention provides a coating material for metal in which a thin coating film without pinholes having excellent strength, solvent resistance, impact resistance, processability etc can be easily formed in a short time when applying on a metal plate and metallic container, compared with a laminate material, and a preparation process thereof. The present invention further provides a metallic container to which the coating material is applied and a preparation process thereof.

Namely, the present invention relates to a coating material for metal comprising thermoplastic resin particles having an average primary particle size of 10 to 1000 nm obtained by cooling a solution of the thermoplastic resin, a metallic container to which the coating material is applied.

Also, the present invention relates to a process for preparing the coating material for metal comprising steps of (a) obtaining a solution, wherein a thermoplastic resin is dissolved into an organic solvent, (b) obtaining a dispersion of particles of the thermoplastic resin having an average primary particle size of 10 to 1000 nm by cooling the solution, (c) separating the particles from the dispersion and (d) dispersing the separated particles into a solvent.

The present invention further relates to a process for preparing the metallic container comprising steps of (A) applying the coating material for metal of the invention to a metal plate, and (B) melting the particles by heating the applied coating material.

BEST MODE FOR CARRYING OUT THE INVENTION

Figure 1:
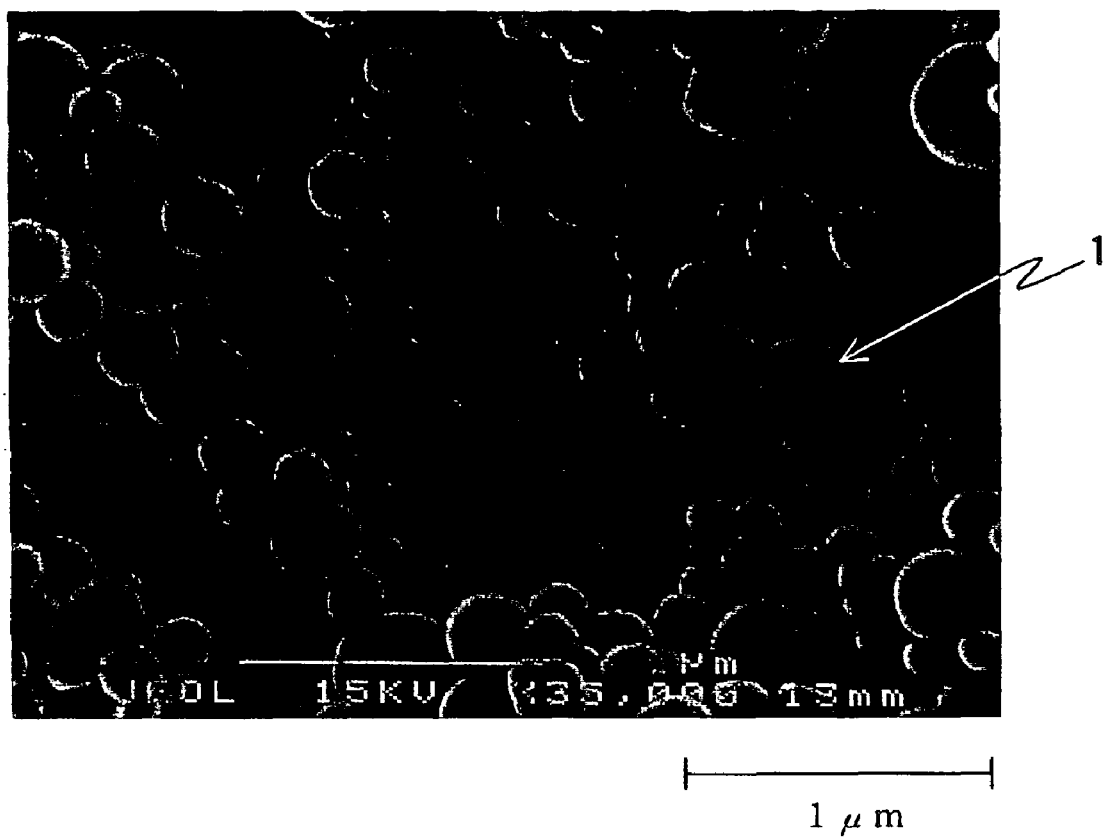
FIG. 1 is a SEM image (×35,000) of the primary particles of a thermoplastic resin (polyethylene terephthalate) obtained in Preparation Example 1.

The coating material for metal of the present invention comprises thermoplastic resin particles having an average primary particle size of 10 to 1000 nm obtained by cooling a solution of the thermoplastic resin.

Examples of an objective metallic material for applying the coating material for metal of the present invention are aluminum, steel, copper, stainless steel, and a metal plate in which a surface treatment is applied thereon. For instance, in case of steel, examples of the metal plate are a tin-plated steel plate (tin plate), a zinc-plated steel plate, and a steel plate electrolytically treated with chromic acid (tin-free steel), but the present invention is not limited thereto.

Examples of the thermoplastic resin are aromatic polyester resins such as polyethylene terephthalate, polyethylene isophthalate, polybutylene terephthalate and polyethylene naphthalate; aliphatic polyester resins such as polylactic acid, polyglycolic acid, polyethylene succinate, polybutylene succinate, poly(butylene succinate-carbonate), poly(butylene succinate-adipate), polyhydroxybutylate, and poly(hydroxybutylate-valerate); polyamide resins such as 6 nylon, 66 nylon, 12 nylon and MXD6 nylon; and a polycarbonate resin. Among those, polyethylene terephthalate, MXD6 nylon, polylactic acid, polyglycolic acid, polybutylene terephthalate, 6 nylon, 66 nylon and polycarbonate are preferable, if selected according to properties such as barrier ability, transparency, other physical properties and safety. In addition, regenerated resins represented by a regenerated PET resin can be used as a thermoplastic resin. However, the thermoplastic resin is not limited thereto.

Examples of a solvent which dissolves a thermoplastic resin are ester solvents such as ethyl acetate and butyl acetate; dibasic acid ester solvents such as dimethyl adipate, dimethyl glutarate and dimethyl succinate; ketone solvents such as cyclohexanone, isophorone and methyl isobutyl ketone; hydrocarbon solvents such as cyclohexane, toluene and xylene; alcohol solvents such as benzyl alcohol and cyclohexanol; ether solvents such as ethyleneglycol monobutyl ether, dipropyleneglycolbutyl ether and bis(2-methoxyethyl) ether; amide solvents such as formamide, dimethylformamide and dimethylacetoamide (DMAc); pyrrolidone solvents such as N-methyl-2-pyrrolidone (NMP), sulfoxide solvents such as dimethyl sulfoxide, water, and a mixture thereof, but are not limited thereto. Among those, a mixed ester solvent comprising dimethyl adipate, dimethyl glutarate and dimethyl succinate, dimethylacetoamide and bis(2-methoxyethyl)ether are preferable when a polyester resin is used as a thermoplastic resin; formamde, benzyl alcohol, dimethylacetoamide and N-methyl-2-pyrrolidone are preferable when a polyamide resin is used as a thermoplastic resin; and a mixed ester solvent comprising dimethyl adipate, dimethyl glutarate and dimethyl succinate is preferable when a polycarbonate resin is used as a thermoplastic resin, in the viewpoint that it is possible to further use a solution after separating particles from the obtained dispersion repeatedly as a solvent which dissolves a thermoplastic resin.

A temperature of a solvent at dissolving the thermoplastic resin is preferably 70 to 200° C. When the thermoplastic resin is polyethylene terephthalate or polybutylene terephthalate, a temperature is preferably 130 to 190° C., and more preferably 140 to 185° C. When the thermoplastic resin is polylactic acid, a temperature is preferably 70 to 150° C., and more preferably 100 to 140° C. When the thermoplastic resin is polyglycolic acid, a temperature is preferably 130 to 170° C., and more preferably 140 to 160° C. When the thermoplastic resin is MXD6 nylon, a temperature is preferably 130 to 180° C., and more preferably 140 to 170° C. Also, when the thermoplastic resin is 6 nylon, a temperature is preferably 120 to 180° C., and more preferably 130 to 170° C. When the thermoplastic resin is 66 nylon, a temperature is preferably 150 to 190° C., and more preferably 170 to 180° C. When the thermoplastic resin is 12 nylon, a temperature is preferably 120 to 150° C., and more preferably 130 to 140° C. When the thermoplastic resin is polycarbonate, a temperature is preferably 130 to 180° C., and more preferably 140 to 170° C. When a temperature of the solvent is less than 70° C., desired particles having an average primary particle size of 10 to 1000 nm do not tend to be obtained since the thermoplastic resin is not dissolved, and when a temperature is more than 200° C., the thermoplastic resins or solvents tend to decompose and change color to yellow.

An amount of the thermoplastic resin into a solvent is preferably 1 to 20 parts by weight based on 100 parts by weight of the solvent, and more preferably 1 to 10 parts by weight. When an amount is less than 1 parts by weight, there is a problem in terms of productivity. Also, when an amount is more than 20 parts by weight, it tends to be difficult to obtain desired particles having an average primary particle size of 10 to 1000 nm.

As a means for cooling a solution of the thermoplastic resin, a cooling system such as a heat exchanger is one example. It is preferable to cool the thermoplastic resin solution of 70 to 200° C. to at most 50° C. and more preferably to at most 45° C. by using the means for cooling. When a temperature of the solution after cooling is more than 50° C., a primary particle size of the obtained particles tends to be large.

As a cooling process, cooling a thermoplastic resin solution itself by using a heat exchanger or by mixing the thermoplastic resin solution into a solvent cooled down to 20 to –90 C. ° with a heat exchanger is suitable. The process of mixing with the cooled solvent is preferable in a viewpoint of cooling efficiency.

As a cooling speed, at least 20° C./s is preferable, at least 50° C./s is more preferable, and 100° C./s is further preferable. When a cooling speed is less than 20° C./s, a primary particle size of the obtained particles tends to be more than 1000 nm.

An average primary particle size of the thermoplastic resin particles obtained by cooling is 10 to 1000 nm, preferably 10 to 800 nm, more preferably 10 to 500 nm, and further preferably 10 to 300 nm. When an average primary particle size is more than 1000 nm, such problems tend to occur that a thickness of the coating film becomes large or a continuous film is not formed in case of making the coating film thin. When an average primary particle size is less than 10 nm, a viscosity of the obtained dispersion becomes high, and an operation for separating tends to be difficult.

An average secondary particle size of the particles is preferably at most 30 μm, and more preferably 1 to 10 μm. When the average secondary particle size is more than 30 μm, the thickness of the coating film becomes large and it shows the tendency that the desired coating film can not be obtained.

Herein, the primary particle is referred to as a particle in a state where the particle can not disperse any more. Also, the secondary particle is referred to as a particle in a state where the primary particle coagulates.

As a process for separating particles from a dispersion containing the particles, examples are infiltration and centrifugation, but are not limited thereto. As a filter for filtering, for example, a ceramic filter is preferable.

Also, it is preferable to dry particles after separating the particles. Examples of a process for drying are vacuum drying, natural drying, drying with a dryer or an oven, but are not limited thereto. However, it is required to preset a temperature at which the particles do not melt when the particles are dried with a dryer or an oven.

The coating material for metal of the present invention comprises thermoplastic resin particles having an average primary particle size of 10 to 1000 nm. However, the coating material for metal may comprise a mixture of at least 2 kinds of the thermoplastic resin particles, and an additive such as a curing agent may be added to the thermoplastic resin particles. It is preferable to add the thermoplastic resin particles to other coating materials since a stronger coating film can be formed.

The above described coating materials are not particularly limited as long as they are generally employed as a coating material, and such material is a thermosetting coating material comprising a polyester resin, an acrylic resin, an epoxy resin, an urethane resin, a melamine resin, a phenol resin, an urea resin etc.

Examples of a solvent in which the obtained particles are dispersed are ester solvents such as ethyl acetate and butyl acetate, dibasic acid ester solvents such as dimethyl adipate, dimethyl glutarate and dimethyl succinate, ketone solvents such as cyclohexanone, isophorone and methyl isobutyl ketone, hydrocarbon solvents such as cyclohexane, toluene and xylene, alcohol solvents such as benzyl alcohol and cyclohexanol, ether solvents such as ethyleneglycol monobutyl ether, dipropyleneglycolbutyl ether and bis(2-methoxyethyl)ether, amide solvents such as formamide, dimethylformamide and dimethylacetoamide, pyrrolidone solvents such as N-methyl-2-pyrrolidone (NMP), water, and a mixture thereof, but are not limited thereto, and any organic solvent suitable for the desired coating material can be used.

When the thermoplastic resin is polyethylene terephthalate, a mixed solvent of cyclohexanone and xylene, a mixed ester solvent comprising dimethyl adipate, dimethyl glutarate and dimethyl succinate, and dimethylacetoamide are preferable; when the thermoplastic resin is polybutylene terephthalate, dimethylacetoamide and a mixed ester solvent comprising dimethyl adipate, dimethyl glutarate and dimethyl succinate are preferable; when the thermoplastic resin is MXD6 nylon, dimethylacetoamide and water are preferable; when the thermoplastic resin is 12 nylon, dimethylacetoamide and benzyl alcohol are preferable; when the thermoplastic resin is 66 nylon, benzyl alcohol is preferable; when the thermoplastic resin is 6 nylon, dimethylacetoamide, benzyl alcohol and N-methyl-2-pyrrolidone are preferable; when the thermoplastic resin is polylactic acid, dimethylacetoamide, ethyl acetate, butyl acetate, dimethyl succinate and methyl isobutyl ketone are preferable; when the thermoplastic resin is polyglycolic acid, bis(2-methoxyethyl)ether and toluene are preferable; and when the thermoplastic resin is polycarbonate, dimethylacetoamide, cyclohexanone and a mixed ester solvent comprising dimethyl adipate, dimethyl glutarate and dimethyl succinate are preferable. A generally used dispersing agent may be used at the dispersing process. An amount of the dispersing agent in use is not particularly limited, and can be used within the extent that the performance of the desired coating film is not damaged.

In addition, for example, acid catalyzers such as sulfonic acids including p-toluenesulfonic acid and dodecylbenzenesulfonic acid, and phosphoric acid including alkyl phosphoric acid, curing aids such as an amine blocking of the acid catalyzers, additives such as a leveling agent, a wetting agent, an antifoaming agent and lubricant, and coloring agents such as a pigment may be added, if necessary.

An amount of the thermoplastic resin particles is preferably at least 5% by weight, more preferably at least 10% by weight, further preferably at least 15% by weight, and particularly preferably at least 20% by weight based on total resins contained in a coating material. When an amount of the thermoplastic resin particles is less than 5% by weight, desired effects do not tend to be obtained.

A ratio of the thermoplastic resin particles and a solvent is not particularly limited, and may be adjusted according to a desired coating film.

Examples of a process for dispersing the thermoplastic resin particles are dispersion with the supersonic wave and dispersion with an agitator. Examples are a homogenizer, a homo mixer, a roll mill, a beads mill and a high-pressure wet pulverizing equipment.

When the secondary particles are dispersed in a solvent, it is preferable to finely divide by selecting a solvent and a process for dispersing, and more preferable to finally form primary particles. Dividing the particles finely enables a thickness of a coating film to control a desirable thickness, and it is possible to finish a smoother coating film.

Application of the coating material of the present invention can be carried out by generally known processes such as roll coating, spray coating, brush coating, knife coating, dip coating, electrodeposition application, and electrostatics application.

When a coating film is formed by using the coating material of the present invention, a weight of the coating film after drying the coating material is preferably adjusted to be 0.1 to 50 g/m$^2$, and the weight is preferably adjusted to be 1 to 50 g/m$^2$, more preferably 3 to 20 g/m$^2$, further preferably 3 to 10 g/m$^2$.

A coating film from the coating material of the present invention is formed by evaporating a solvent by heating after the coating material is applied, and then, melting particles. According to this process, an uniform coating film without pinholes is formed to obtain the coating film excellent in solvent resistance.

A heating temperature is preferably 100 to 300° C., and more preferably 150 to 280° C. A heating time is preferably 10 to 60 seconds, and more preferably 15 to 30 seconds. Further, it is preferable to cool with water after heating. This is because each physical property such as appearance of the coating film and processability is more excellent due to cooling with water.

The metallic container of the present invention can be obtained by forming with a metal plate coated by the coating material of the present invention. The metallic container can be also obtained by applying the coating material of the present invention to a metallic container without any other coating. A process for preparing the metallic container is not particularly limited, and its shape of the metallic container is not limited as well. Examples of the metallic container are beverage can, food can, decorated can, aerosol can, 18 L can, a dry battery shell, a battery shell or caps thereof.

The coating material of the present invention is an excellent coating material as a coating material for metal wherein a coating film without pinholes having excellent corrosion resistance, retort resistance, impact resistance, excellent processability, abrasion resistance, adhesiveness to metal, flavor preservability for contents etc can be formed when applying on a metal plate.

The coating material of the present invention is explained based on Examples in the following, but is not limited thereto.

<Average Primary Particle Size>

An average primary particle size is measured by using a scanning electron microscope (JEM-6301F, made by JEOL Ltd.) and Dynamic Light Scattering Nanoparticle Size Analyzer (LB-550, made by HORIBA, Ltd.).

<Film Thickness>

A film thickness is measured by using an Electromagnetic/Eddy-current Coating Thickness Tester (LZ-200W, made by Kett Electric Laboratory).

<Pencil Hardness>

Pencil hardness is measured by UNI (product name) made by MITSUBISHI PENCIL CO., LTD., according to JIS K-5400 (1990).

<Solvent Resistance>

16 sheets of gauze are overlapped to fix on a convex part of a 2 pounds hammer and shuttled on a coated plate after wetting well with methyl ethyl ketone, and the number of times when the coating film is peeled off is regarded as solvent resistance.

<Impact Resistance>

Impact resistance is measured by using Du Pont type Impact Tester (made by Toyo Seiki Seisaku-sho, Ltd.) according to a process described in JIS K-5400 (1990). Then, Cellotape (registered trademark) made by NICHIBAN., LTD. is put on a convex part and stuck tightly, then peeled off suddenly toward a direction of 90 degree against a coated side. A state of the coated side on the convex part is observed visually to evaluate according to the following evaluation standard.

A—Peeling is not observed at all.

B—Peeling is observed in part.

C—Peeling is observed on the whole.

<Bending Properties>

Bending properties are measured by using a Mandrel Bend Tester (made by Toyo Seiki Seisaku-sho, Ltd). The measurement is carried out by 1 T (a test wherein one plate for the bending test is sandwiched between the same plates). Then, Cellotape (registered trademark) made by NICHIBAN., LTD. is put on a convex part and stuck tightly, then peeled off suddenly toward a direction of 90 degree against a coated side. A state of the coated surface on the convex part is observed visually to evaluate according to the following evaluation standard.

A—Peeling is not observed at all.

B—Slight needled hair-like peeling having a length of less than 0.5 mm is observed, but practically is not a problem.

C—Peeling having a length of at least 5 mm is observed.

D—Peeling is already observed before Cellotape (registered trademark) is stuck.

<Punching Processability>

Press forming is carried out by using PP (pilfer proof) cap press forming machine (made by Nihon Seiki Kogyo Co., Ltd.).

Two-staged press forming
(1) φ40 mm×21 mm
(2) φ30 mm×35 mm

A state of the tested cap is evaluated according to the following evaluation standard by visual observation.

A—Peeling is not observed at all.

B—Slight roughness appears, but peeling is not observed.

C—Peeling of about 10 mm from the bottom is observed.

D—Peeling up to the upper part is observed.

<Pinhole Properties>

A coating plate of 100 cm$^2$ after baking the plate is immersed into a 1% saline water containing 0.3% of a surfactant, then a voltage of 6V is applied to the plate and an amount of electric current after 4 seconds is represented by milliampere (mA). The smaller the mA value, the less coating defects are, which shows a preferable coating.

Preparation Example 1

Preparation of Polyethylene Terephthalate Resin Particles

A 1 liter four-necked flask equipped with a thermometer and an agitator was charged with 30 g of polyethylene terephthalate (MA-1340P, available from UNITIKA LTD.) copolymerized with 8% by mol of isophthalic acid as a thermoplastic resin, and 570 g of a mixture of dimethyl adipate, dimethyl glutarate and dimethyl succinate (DBE (registered trademark), available from DuPont Kabushiki Kaisha) as a solvent. Then, a temperature of the solvent is adjusted at 180° C. and the thermoplastic resin was dissolved into the solvent. The obtained hot solution was mixed with the cold DBE solvent which was cooled at −35° C. with a heat exchanger (made by MTECHNIC CO., LTD.). A dispersion (dispersed solution) containing particles of the thermoplastic resin was obtained. A temperature of the dispersed soluiton after 1 second from a point of mixing was 45° C.

Particles were separated from the obtained dispersion by using Sharples Centrifuge (made by TOMOE Engineering Co., Ltd.) to obtain a filter cake. The obtained cake had a solvent content rate of 75%.

Figure 2:
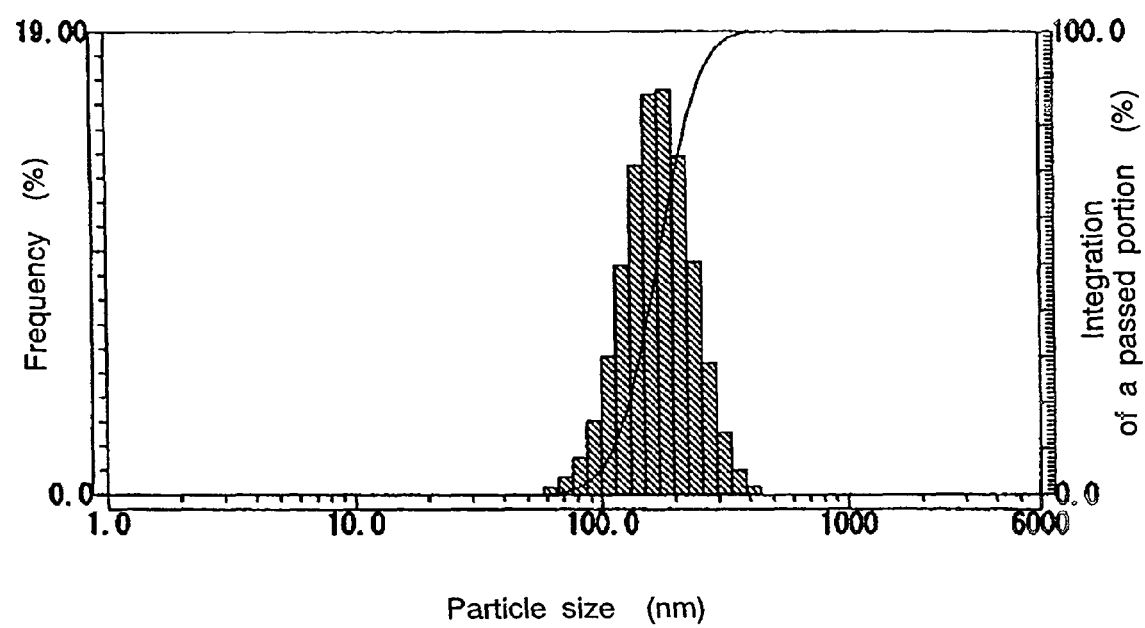
FIG. 2 is a diagram showing a distribution of the particle size of the thermoplastic resin (polyethylene terephthalate) particles obtained in Preparation Example 1.

An average primary particles size was at most 200 nm found by a SEM image of the obtained particle (FIG. 1) and the distribution of the particle size (FIG. 2).

Preparation Example 2

Preparation of MXD6 Nylon (Methaxylylenediamineadipamide) Resin Particles

A 1 liter four-necked flask equipped with a thermometer and an agitator was charged with 30 g of MXD6 nylon (6007, available from MITSUBISHI GAS CHEMICAL COMPANY, INC.) as a thermoplastic resin, and 570 g of formamide as a solvent. Then, a temperature of the solvent was adjusted at 140° C. and the thermoplastic resin was dissolved into the solvent. The obtained hot solution was mixed with the cold dimethylformamide solvent which was cooled at −35° C. with a heat exchanger. A dispersed solution containing particles of the thermoplastic resin was obtained. A temperature of the dispersed solution after 1 second from a point of mixing was 35° C.

Particles were separated from the obtained dispersion by using Sharples Centrifuge to obtain a filter cake. The obtained cake had a solvent content rate of 80%.

Figure 3:
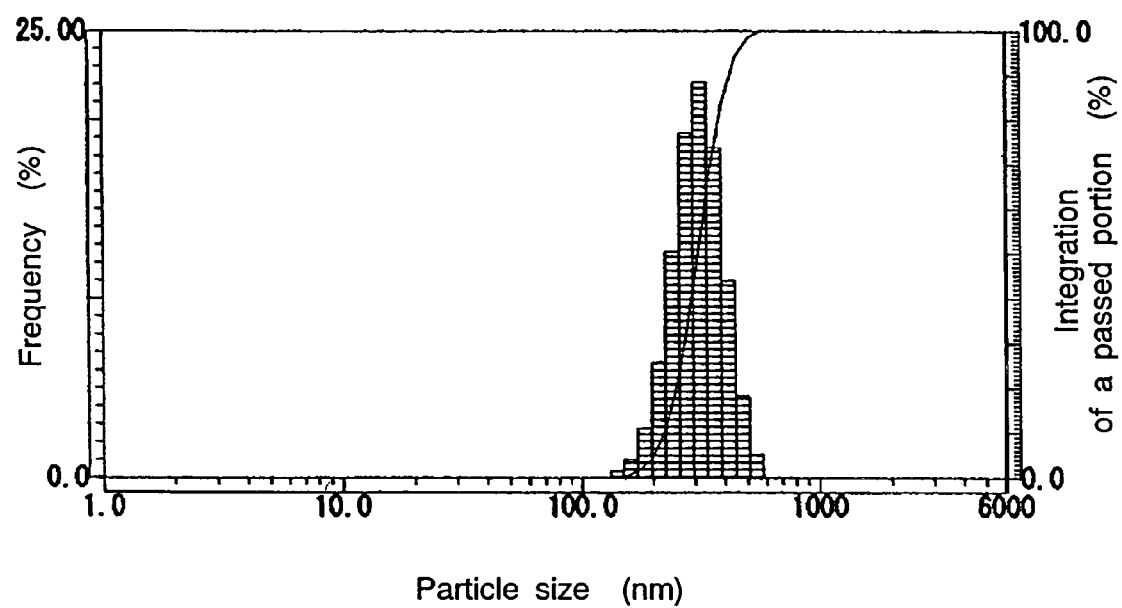
FIG. 3 is a diagram showing a distribution of a particle size of the thermoplastic resin (MXD6 nylon) particles obtained in Preparation Example 2.

An average primary particle size of the obtained particles was at most 400 nm found by the distribution of the particle size (FIG. 3).

Preparation Example 3

Preparation of Polylactic Acid Resin Particles

A dispersed solution comprising particles of a thermoplastic resin was obtained in the same manner as Preparation Example 1, by using polylactic acid as a thermoplastic resin and DBE as a solvent, in which a temperature at dissolving was 140° C. and a cooling temperature was −35° C. A temperature of the dispersed solution after 1 second from a point of mixing was 35° C.

Particles were separated from the obtained dispersion by using Sharples Centrifuge to obtain a filter cake in the same manner as Preparation Example 1. The obtained cake has a solvent content rate of 71%.

Figure 4:
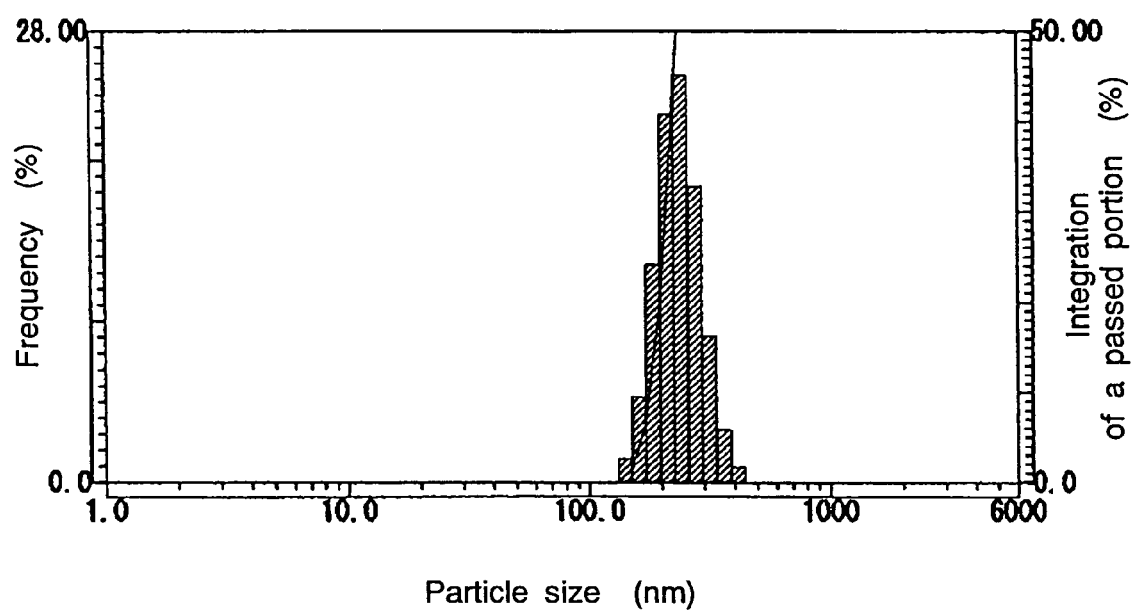
FIG. 4 is a diagram showing a distribution of a particle size of the thermoplastic resin (polylactic acid) particles obtained in Preparation Example 3.

An average primary particle size of the obtained particles was at most 250 nm found by the distribution of the particle size (FIG. 4).

Preparation Example 4

Preparation of Polyglycolic Acid Resin Particles

A dispersed solution comprising particles of a thermoplastic resin was obtained in the same manner as Preparation Example 1, by using a polyglycolic acid (PGA-P, available from Mitsui Chemicals, Inc.) as a thermoplastic resin and a bis(2-methoxyethyl)ether as a solvent, in which a temperature at dissolving was 150° C. and a cooling temperature was −35° C. A temperature of the dispersed solution after 1 second from a point of mixing was 37° C.

Particles were separated from the obtained dispersion by using Sharples Centrifuge to obtain a filter cake in the same manner as Preparation Example 1. The obtained cake had a solvent content rate of 73%.

Figure 5:
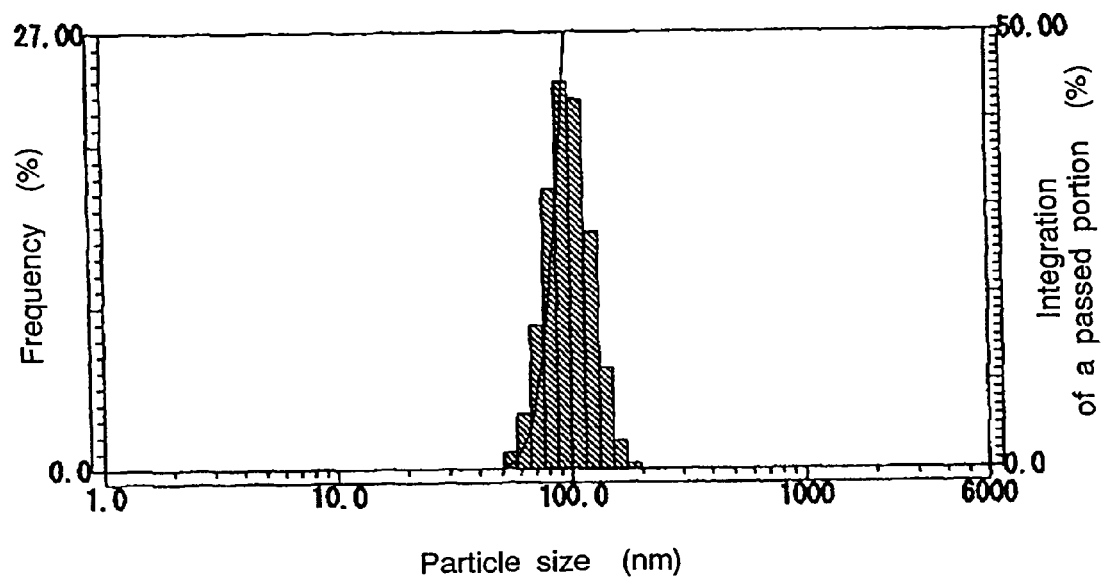
FIG. 5 is a diagram showing a distribution of a particle size of the thermoplastic resin (polyglycolic acid) particles obtained in Preparation Example 4.

An average primary particle size of the obtained particles was at most 150 nm found by the distribution of the particle size (FIG. 5).

Preparation Example 5

Preparation of Polybutylene Terephthalate Resin Particles

A dispersed solution comprising particles of a thermoplastic resin was obtained in the same manner as Preparation Example 1, by using polybutylene terephthalate (NOVADURAN5008, available from Mitsubishi Engineering-Plastics Corporation) as a thermoplastic resin and DBE (registered trademark) (available from DuPont Kabushiki Kaisha) as a solvent, in which a temperature at dissolving was 185° C. and a cooling temperature was −35° C. A temperature of the dispersed solution after 1 second from a point of mixing was 45° C.

Particles were separated from the obtained dispersion by using Sharples Centrifuge to obtain a filter cake in the same manner as Preparation Example 1. The obtained cake had a solvent content rate of 80%.

Figure 6:
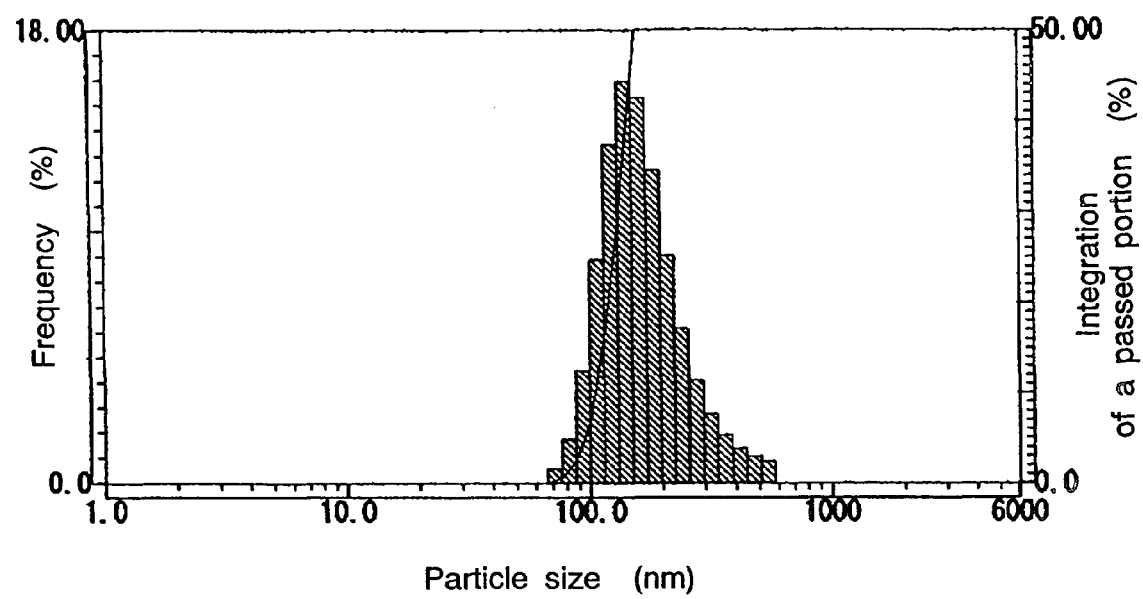
FIG. 6 is a diagram showing a distribution of a particle size of the thermoplastic resin (polybutylene terephthalate) particles obtained in Preparation Example 5.

An average primary particle size of the obtained particles was at most 200 nm found by the distribution of the particle size (FIG. 6).

Preparation Example 6

Preparation of 6 Nylon Resin Particles

A dispersed solution comprising particles of a thermoplastic resin was obtained in the same manner as Preparation Example 1, by using 6 nylon (NOVAMID1010J, available from Mitsubishi Engineering-Plastics Corporation) as a thermoplastic resin and N-methyl-2-pyrrolidone (available from Mitsubishi Chemical Corporation) as a solvent, in which a temperature at dissolving was 170° C. and a cooling temperature was −20° C. A temperature of the dispersed solution after 1 second from a point of mixing was 38° C.

Particles were separated from the obtained dispersion by using Sharples Centrifuge to obtain a filter cake in the same manner as Preparation Example 1. The obtained cake had a solvent content rate of 79%.

Figure 7:
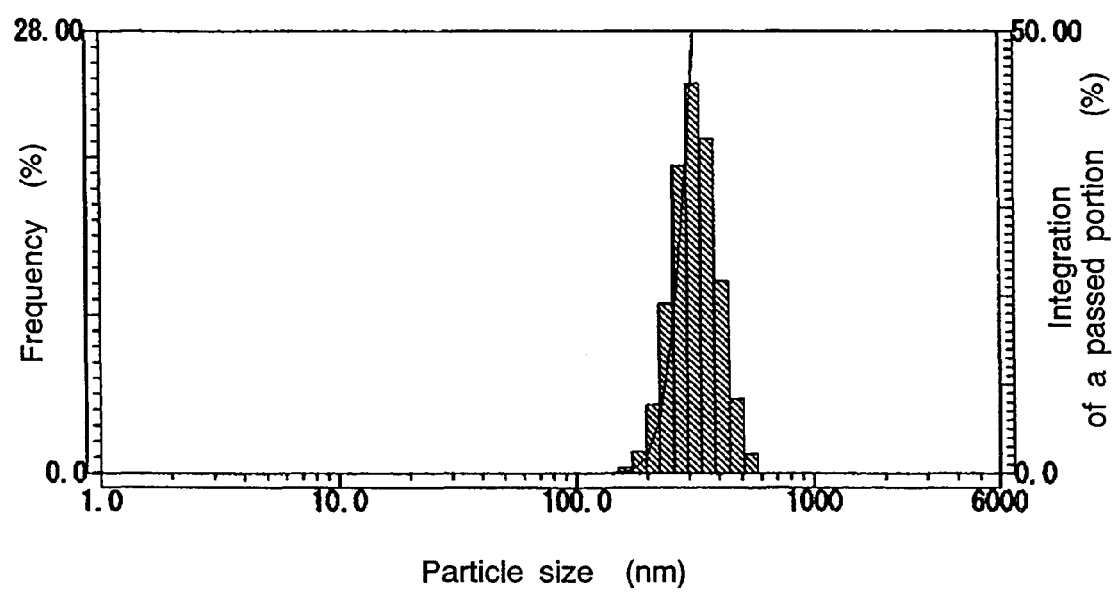
FIG. 7 is a diagram showing a distribution of a particle size of the thermoplastic resin (6 nylon) particles obtained in Preparation Example 6.

An average primary particle size of the obtained particles was at most 350 nm found by the distribution of the particle size (FIG. 7).

Preparation Example 7

Preparation of 66 Nylon Resin Particles

A dispersed solution comprising particles of a thermoplastic resin was obtained in the same manner as Preparation Example 1, by using 66 nylon (NOVAMID3010, available from Mitsubishi Engineering-Plastics Corporation) as a thermoplastic resin and benzyl alcohol (available from Tohoku Tosoh Chemical Corporation) as a solvent, in which a temperature at dissolving was 170° C. and a cooling temperature was −15° C. A temperature of the dispersed solution after 1 second from a point of mixing was 37° C.

Particles were separated from the obtained dispersion by using Sharples Centrifuge to obtain a filter cake in the same manner as Preparation Example 1. The obtained cake had a solvent content rate of 77%.

Figure 8:
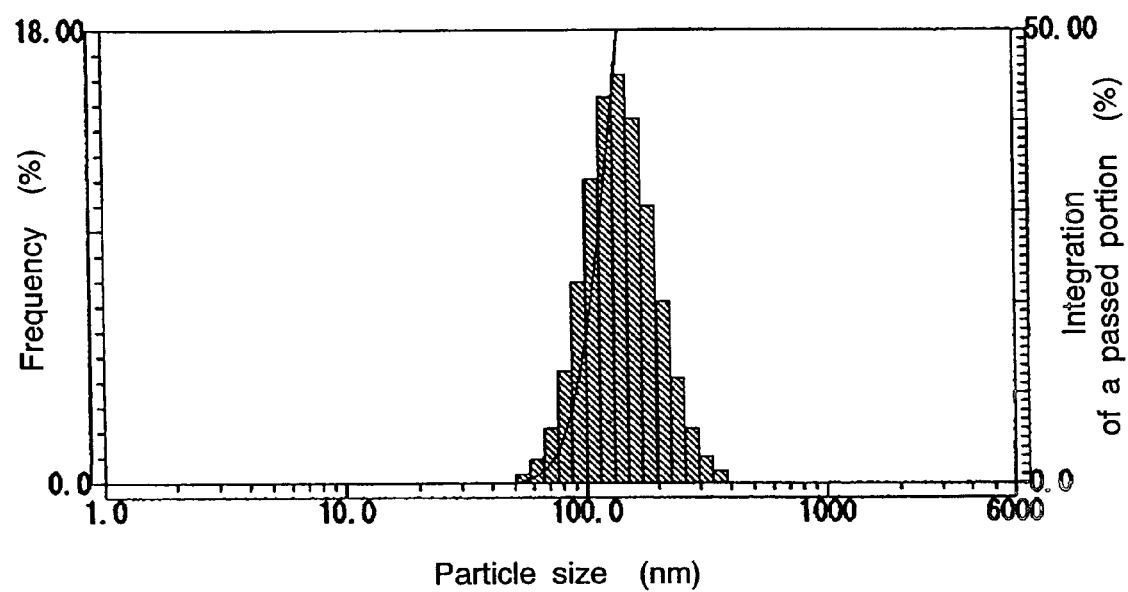
FIG. 8 is a diagram showing a distribution of a particle size of the thermoplastic resin (66 nylon) particles obtained in Preparation Example 7.

An average primary particle size of the obtained particle was at most 200 nm found by the distribution of the particle size (FIG. 8).

Preparation Example 8

Preparation of Polycarbonate Resin Particles

A dispersed solution comprising particles of a thermoplastic resin was obtained in the same manner as Preparation Example 1, by using polycarbonate (LUPILON S-2000R, available from MITSUBISHI GAS CHEMICAL CAMPANY, INC.) as a thermoplastic resin and DBE as a solvent, in which a temperature at dissolving was 170° C. and a cooling temperature was −20° C. A temperature of the dispersed solution after 1 second from a point of mixing was 38° C.

Particles were separated from the obtained dispersion by using Sharples Centrifuge to obtain a filter cake in the same manner as Preparation Example 1. The obtained cake had a solvent content rate of 64%.

Figure 9:
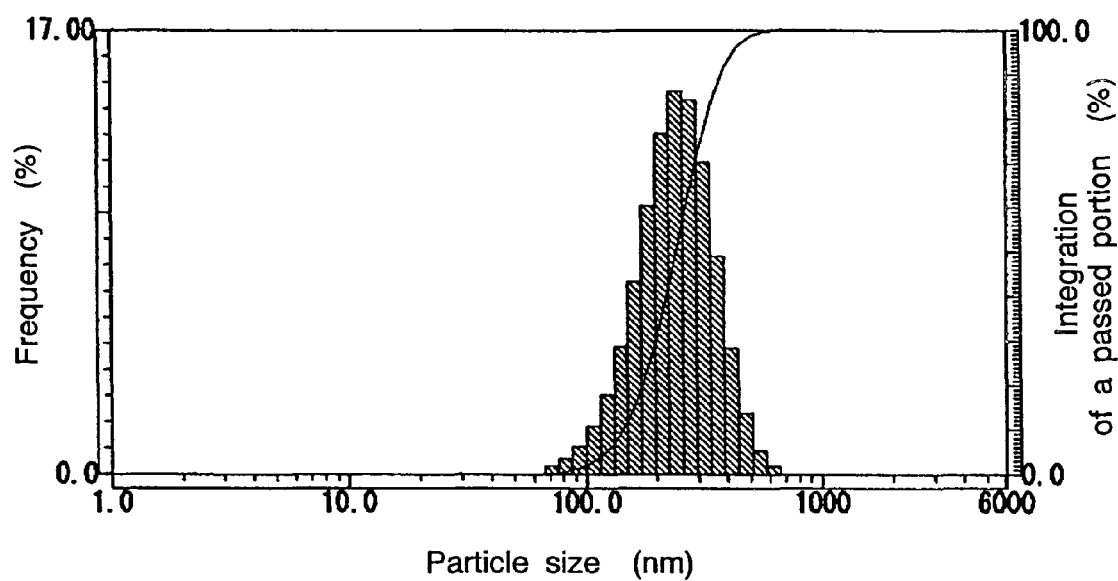
FIG. 9 is a diagram showing a distribution of a particle size of the thermoplastic resin (polycarbonate) particles obtained in Preparation Example 8.

An average primary particle size of the obtained particles was at most 300 nm found by the distribution of the particle size (FIG. 9).

Example 1

Addition of Thermoplastic Resin Particles to a Polyester Thermosetting Coating Material A 2 L container was charged with 100 g of the cake of the thermoplastic resin obtained in Preparation Example 1, 1223.3 g of a polyester resin (VYLON GK880, cyclohexanone/xylene solvent having the ratio of 1:1, solid content of 30% by weight, available from TOYOBO., LTD.), 28.0 g of a melamine resin (Cymel 303, solid content of 100% by weight, available from Mitsui Cytec Inc.), 5.4 g of a carnauba wax dispersion (SL506, a dispersed article in dipropyleneglycolmono-n-butylether, solid content of 18.5% by weight, available from SAN NOPCO LIMITED), 0.5 g of dodecylbenzenesulfonic acid, 88.8 g of a solvent mixture of cyclohexanone/xylene, in which the ratio is 1:1, and 200 g of 2 mmϕ glass beads, and screw the container cap on tightly, then, a coating material for metal was obtained by dispersing for 2 hours with Paint Shaker (made by ASADA IRON WORKS. CO., LTD.) and separating from the glass beads by filtering with a gauze. The obtained coating material had a solid content of 23.5% and viscosity of 25 seconds (Ford Cup No. 4).

The obtained coating material was painted on an aluminum plate (5052 material, a plate thickness of 0.23 mm, a size of 12 cm×20 cm) without coating by using Bar Coater #14 to have a film thickness of 4 μm after drying (coating amount after drying of 4.8 g/m²), and cooled with water after leaving the plate in a hot air circulation oven (made by Kabushikikaisya SHOEI Seisakusyo), in which a temperature was preset at 260° C. and a wind speed at 20 m/sec, for 20 seconds.

Results of performance testings of the obtained coating film are shown in Table 2.

Example 2

A 900 mL bottle of mayonnaise was charged with 100 g of the cake of the thermoplastic resin obtained in Preparation Example 1, 0.25 g of a carnauba wax dispersion (SL506, a dispersed article in dipropyleneglycolmono-n-butylether, solid content of 18.5% by weight, available from SAN NOPCO LIMITED), 150 g of DBE, and 150 g of 2 mmϕ glass beads, and screw the bottle cap on tightly, then, a coating material for metal was obtained by dispersing for 2 hours with Paint Shaker (made by ASADA IRON WORKS. CO., LTD.) and separating from the glass beads by filtering with a gauze. The obtained coating material had a solid content of 10.0% and viscosity of 33 seconds (Ford Cup No. 4).

The obtained coating material was painted on an aluminum plate (5052 material, a plate thickness of 0.23 mm, a size of 12 cm×20 cm) without coating by using Bar Coater #14 to have a film thickness of 4 μm after drying (coating amount after drying of 5.6 g/m²), and cooled with water after leaving the plate in a hot air circulation oven (made by Kabushikikaisya SHOEI Seisakusyo), in which a temperature was preset at 260° C. and a wind speed at 20 m/sec, for 20 seconds.

Results of performance testings of the obtained coating film are shown in Table 2.

Examples 3 to 9

The cake of the thermoplastic resin obtained in Preparation Examples 2 to 8 was weighted out to have a resin solid content of 25 g, then each dispersing solvent shown in Table 1 was added to have the total weight of 250 g, and a coating material for metal having a solid content of 10% by weight was obtained by employing 0.25 g of a carnauba wax dispersion and 150 g of 2 mmϕ glass beads in the same manner as Example 1.

A test plate was prepared by painting the obtained coating material in the same manner as Example 1 to make a film at each temperature.

TABLE 1

| | Thermoplastic resin | Dispersing solvent | Viscosity of coating material (second) | Amount of application after drying (g/m²) | Oven preset temperature (° C.) |
|---|---|---|---|---|---|
| Ex. 1 | Polyethylene terephthalate | DBE | 25 | 4.8 | 260 |
| Ex. 2 | Polyethylene terephthalate | DBE | 33 | 5.6 | 260 |
| Ex. 3 | MXD6 nylon | Water | 90 | 4.8 | 260 |
| Ex. 4 | Polylactic acid | Ethyl acetate | 17 | 5.2 | 200 |
| Ex. 5 | Polyglycolic acid | Toluene | 10 | 6.4 | 230 |
| Ex. 6 | Polybutylene terephthalate | DBE | 28 | 5.6 | 260 |
| Ex. 7 | 6 nylon | NMP | 26 | 4.4 | 250 |
| Ex. 8 | 66 nylon | Benzyl alcohol | 30 | 4.4 | 280 |
| Ex. 9 | Polycarbonate | DBE | 14 | 4.8 | 250 |
| Com. Ex. 1 | Vylon GK880 | Cyclohexanone/Xylene | 35 | 4.8 | — |

Comparative Example 1

A 2 L stainless beaker was charged with 1306.7 g of a polyester resin (VYLON GK880, cyclohexanone/xylene solvent having the ratio of 1:1, solid content of 30% by weight, available from TOYOBO., LTD.), 28.0 g of melamine resin (Cymel 303, solid content of 100% by weight, available from Mitsui Cytec Inc.), 5.4 g of a carnauba wax dispersion (SL506, a dispersed article in dipropyleneglycolmono-n-butylether, solid content of 18.5% by weight, available from SAN NOPCO LIMITED), 0.5 g of dodecylbenzenesulfonic acid, 105.4 g of a solvent mixture in which cyclohexanone/xylene is 1:1, then a coating material for metal which does not contain particles of the thermoplastic resin was obtained by agitating with Disper (made by ASADA IRON WORKS. CO., LTD.) for 10 minutes. The obtained coating material had a solid content of 23.5% and viscosity of 35 seconds (Ford Cup No. 4).

A test plate was prepared using the obtained coating material in the same manner as Example 1.

Results of performance testings of the obtained coating film are shown in Table 2.

TABLE 2

| | Performance evaluation | | | | | |
|---|---|---|---|---|---|---|
| | Pencil hardness | Solvent resistance (No. of times) | Impact resistance | Bending properties | Punching processability | Pinhole properties (mA) |
| Ex. 1 | 4H | 36 | A | A | B | 0.01 |
| Ex. 2 | 3H | 100 | A | A | A | 0.01 |
| Ex. 3 | 5H | >100 | A | A | A | 0.01 |
| Ex. 4 | 5H | 3 | A | A | A | 0.01 |
| Ex. 5 | H | 5 | A | A | A | 0.01 |
| Ex. 6 | 3H | >100 | A | A | A | 0.01 |
| Ex. 7 | H | >100 | A | A | A | 0.01 |
| Ex. 8 | H | >100 | A | A | A | 0.01 |
| Ex. 9 | 5H | 3 | B | B | B | 0.01 |
| Com. Ex. 1 | 2H | 21 | B | C | C | 0.03 |

INDUSTRIAL APPLICABILITY

The coating material of the present invention can be favorably used as a coating material for metal since the coating material can form a coating film without pinholes having excellent corrosion resistance, retort resistance, impact resistance, processing resistance, abrasion resistance, adhesiveness to a metal, flavor perservability for contents etc by applying on a metal plate or a metallic container.

The invention claimed is:

1. A process for preparing a coating material for metal comprising steps of:
    (a) obtaining a solution at 70 to 200° C. wherein a thermoplastic resin selected from the group consisting of polyethylene terephthalate, polylactic acid, polyglycolic acid, and polybutylene terephthalate is dissolved into an organic solvent;
    (b) obtaining a dispersion of condensation polymerized resin particles of said thermoplastic resin having an average primary particle size of 10 to 400 nm by mixing the solution with the same organic solvent as the said organic solvent, which is previously cooled down to 20 to −90° C., whereby the dispersion is cooled at a cooling speed of at least 100° C./s;
    (c) separating the particles from said dispersion and
    (d) dispersing said separated particles into a solvent.

2. A process for preparing a coated metallic container comprising steps of:
    (A) applying a coating material prepared by the process of claim 1 to a metal plate, the coating material comprising condensation polymerized thermoplastic resin particles having an average primary particle size of 10 to 400 nm obtained by said cooling a solution of said resin, wherein the thermoplastic resin is selected from said group consisting of polyethylene terephthalate, polylactic acid, polyglycolic acid, and polybutylene terephthalate; and
    (B) melting the particles by heating said applied coating material.

3. The process according to claim 2, wherein the coating material applied to the metal plate is a uniform thin coating film having a weight of 0.1 to 50 g/m$^2$ and a thickness of less than or equal to 4 μm without pin holes.

4. The process according to claim 2, wherein the applied coating material on the metal plate is a coating film weighing, after drying, 1 to 50 g/m$^2$.

* * * * *